United States Patent
Rayburn

[15] 3,654,532
[45] Apr. 4, 1972

[54] MULTILAYER PLASTIC CHIP CAPACITOR

[72] Inventor: Charles C. Rayburn, Falls Curch, Va.
[73] Assignee: Illinois Tool Works Inc., Chicago, Ill.
[22] Filed: May 25, 1970
[21] Appl. No.: 40,012

[52] U.S. Cl. ............................317/258, 317/260, 317/261
[51] Int. Cl. .....................................................H01g 1/14
[58] Field of Search ...................317/242, 260, 258, 261

[56] References Cited

UNITED STATES PATENTS

| | | | |
|---|---|---|---|
| 1,173,452 | 2/1916 | Meirowsky | 317/261 |
| 2,921,246 | 1/1960 | Peck | 317/260 |
| 3,214,657 | 10/1965 | Davis | 317/260 |
| 3,327,184 | 6/1967 | Valley | 317/258 |
| 3,506,895 | 4/1970 | Viellerman | 317/260 |

Primary Examiner—E. A. Goldberg
Attorney—Robert W. Beart, Michael Kovac, Barry L. Clark and Jack R. Halvorsen

[57] ABSTRACT

Multiplayer chip capacitors and method of making whereby two-side metalized plastic strip material is wound in annular hoop form and opposite sides of hoop are pressed together to bond layers together. The metalized plastic strip is pre-coated with a very thin coating of a heat sealable material such as plastic which functions as a capacitor dielectric and also as a bonding agent. The marginal edges of the pressed hoop are sprayed with molten aluminum at high velocity which makes contact with the edges of the thin metalized layers and penetrates the plastic coating to also provide contact with marginal portions of the metalized electrode coatings. The flattened hoop is then sliced into a plurality of capacitors which can be made to have any value desired over a large range by cutting them to a particular width. Values can be controlled very precisely by first cutting and testing one capacitor and then altering the width of later cut capacitors relative to the tested one. The uncut capacitors can be stored and cut to value as needed.

2 Claims, 19 Drawing Figures

Patented April 4, 1972
3,654,532
2 Sheets-Sheet 1
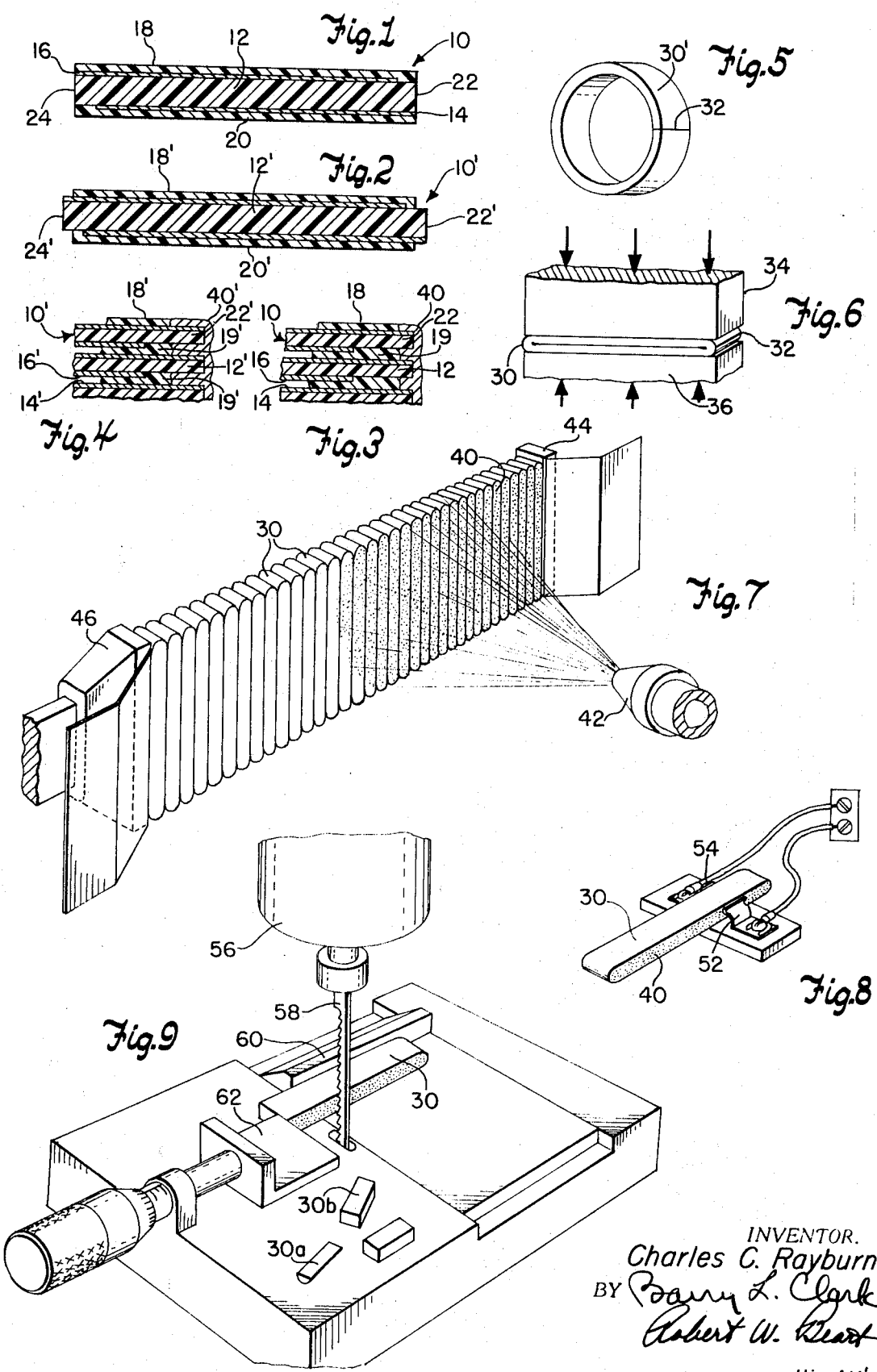
INVENTOR.
Charles C. Rayburn
BY Barry L. Clark
Robert W. Heart
His Att'ys Patented April 4, 1972
3,654,532
2 Sheets-Sheet 2
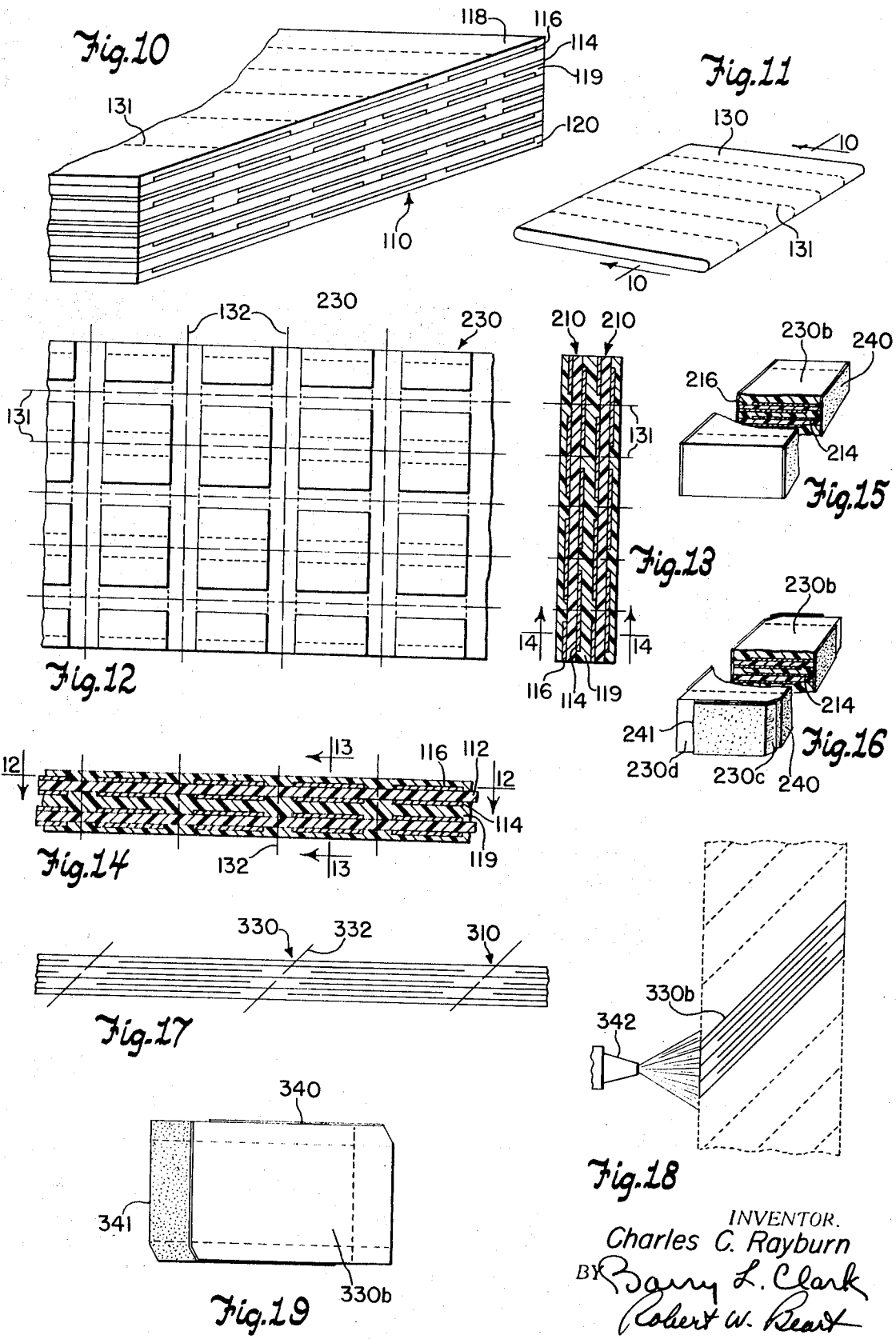
INVENTOR.
Charles C. Rayburn
BY Barry L. Clark
Robert W. Beart
His Att'ys

MULTILAYER PLASTIC CHIP CAPACITOR

BACKGROUND OF THE INVENTION

A rolled capacitor made from two-side metalized polyester film material, having a heat sealable coating of plastic material applied to each of the metalized layers for holding the capacitor together and to exclude air from between the layers is described in U.S. Pat. No. 3,214,657. Although the rolled capacitor described in the aforementioned patent has many advantages, it has certain disadvantages common to all rolled capacitors in that each capacitor must be separately rolled and mounted for lead attachment. Furthermore, where different values of capacitance are desired, the length and/or width of the region of overlapped electrodes must be varied during the winding of the capacitors. Another disadvantage of a rolled-type capacitor is that it cannot be directly connected to a printed circuit board or substrate without first having leads attached to it.

In U.S. Pat. No. 2,731,706, a method of making capacitors is shown wherein a pair of strips of one-side metalized plastic film are wound in annular form about a forming ring. After several convolutions of film are placed on the forming ring, the ends of the film are sealed and the forming ring, with the convolutions of film attached to it is removed from the winding machine and subjected to several operations including the cutting apart of individual capacitors.

It is an object of this invention to provide a plastic chip capacitor which can provide sufficient capacitance in a given volume so as to compare favorably with ceramic chip capacitors or wet Tantalum electrolytic capacitors.

It is a further object of the invention to provide a plastic chip capacitor which, as compared to high K multilayer ceramic capacitors, offers a lower voltage coefficient, a lower temperature coefficient, freedom from capacitance aging, and self-healing properties.

An additional object of the invention is to provide a chip capacitor which will have a very low material cost, will provide excellent yield control, shorter production cycles, lower equipment investment and lower material inventory cost than other types of capacitors now available.

The preceding and other objects are obtained by the capacitor of the present invention and the method by which it is made. The capacitor comprises a plurality of layers of two-side metalized plastic dielectric material which has had a very thin coating of dielectric such as plastic applied to at least one of its metalized surfaces. For ease of manufacture, it is preferable that the plastic coating material extends to the edges of the capacitor. Since the metal electrodes which are formed by vapor depositing aluminum are extremely thin, it is obvious that there is extremely little electrode surface exposed at the end of the capacitor to which a terminal may be attached. It is also obvious that good contact must be made between each of the alternate electrode layers which extend to a common end of the capacitor in order to place all of the electrodes in the electric field. I have found that satisfactory contact to each layer can be made by subjecting the ends of the capacitor to a high velocity spray of molten metal, preferably aluminum, which embeds itself in the plastic coatings between the metalized layers so as to contact the surface as well as the ends of the electrodes, but does not substantially penetrate the plastic dielectric strip so as to permit a shorting out of the electrodes of opposite polarity thereon which are spaced interiorly of the ends of the capacitor.

The preferred method for making the plastic chip capacitor as described herein is to wind the plastic coated metalized dielectric material about a large diameter mandrel so as to form a hoop. The hoop may be heat sealed along a line to anchor the outermost convolution. After winding the hoop, the hoop is placed between a pair of press platens which flatten it under pressure. The platens are then heated to bring the heat-fusible thin plastic film coating between the electrode layers to a fusing temperature. During the heating of the capacitor layers, a light pressure is maintained which is sufficient to exclude air and bring the surfaces into an intimate contact and yet is low enough to prevent the thin plastic coating from extruding and thus uncontrollably varying its thickness and thus, its capacitance. After fusion occurs, the pressure is maintained and the platens are cooled, following which the capacitor flat is removed as a solid block.

The capacitor flat is then subjected to a metal spraying operation wherein an oxygen-acetylene flame melts continuously fed aluminum wire while a concentric, high velocity, air stream breaks up the molten aluminum into particles about 0.001 inch in diameter and impels them against the thermoplastic capacitor flat. The capacitor flat is then cleared by subjecting it to a DC voltage equivalent to about one quarter of its intended rated DC voltage to burn open any major shorting areas. This procedure is then followed by a high DC voltage, usually twice the rated voltage, to complete the clearing process. After clearing the capacitor flat, its capacitance value is measured since the two ends of the flat, which are scrap, can be considered as forming the two halves of a cylindrical capacitor, the relative area of the cylindrical capacitor as compared to the flat remaining area can be readily figured mathematically and its value subtracted from the total value read in order to permit the capacitance per unit of length of the flat area to be determined.

The capacitor flat may then be cut into a plurality of identical individual chips which will have a very uniform value since the active area, film thickness and dielectric constant are very uniform within a given capacitor flat. To achieve a predetermined value of capacitance, the first chip or two cut from a flat may be value sampled and a vernier stop on a cutting mechanism adjusted so that the value of subsequently cut chips will achieve the predetermined target value. After the chips are cut, their values may be adjusted slightly downwardly if desired by the application of a high voltage in order to burn back the electrode surface and thus reduce the electrode area. Cutting can be done by many types of equipment, such as a high speed saw, a hot wire, a high speed friction blade or a shear. Since each of these cutting techniques would present the possibility of wiping electrode material between electrodes along the cut edges, it is necessary to clear the parts again after cutting to burn open the conductive paths. The additional step of clearing after cutting can be avoided if the metalized material wound in forming the capacitor is appropriately demetalized in those areas where cutting will take place.

By winding the hoop from which the chips are cut from metalized strips having multiple metalized patterns which are staggered transversely, it is possible to achieve a capacitor flat which may be cut in two directions to form a large plurality of chips.

Where the chips are formed by cutting the flat in two directions, it is, of course, necessary to apply the terminations after the cutting takes place. This may be done by stacking the cut chips so that one edge of each chip lies in a plane which is then subjected to a metal spraying operation. By spraying aluminum on the edges of the capacitor containing the electrode terminals and continuing the spray around an adjacent end and then applying a coating of solder onto the end, it becomes possible to solder the chip to a tinned substrate pattern by the momentary addition of heat and solder in the localized area on the said end edge of the capacitor. The solder coating permits the connection between the metalized electrodes and the sprayed aluminum to remain cool during soldering and thereby minimizes any chance of thermal damage.

In order to enhance the degree of contact of the sprayed aluminum coatings to the extremely thin electrodes, the capacitor chips may be cut on an angle rather than perpendicular to the planes of the electrode layers. Such angled cutting increases the width of the exposed edge surface and also presents the electrodes at the edge in step-wise fashion so that the sprayed metal will contact not only the outer edges, but a portion of the marginal length of each electrode.

BRIEF DESCRIPTION OF THE DRAWINGS

FIG. 1 shows a cross-section of a two-side metalized and plastic coated dielectric strip used in making the capacitor of the invention;

FIG. 2 is a view similar to FIG. 1 showing a modified form of strip with a marginally recessed plastic coating;

FIG. 3 shows a fragmentary cross-section of a marginal portion of a multilayer stack capacitor made from the strip shown in FIG. 1 after a spray metal coating has been applied thereto;

FIG. 4 is a view similar to FIG. 3 showing the application of a spray metal coating to a stack capacitor made from the strip shown in FIG. 2;

FIG. 5 is a perspective view showing the strip material of FIG. 1 wound into a hoop;

FIG. 6 is a view illustrating the flattening under pressure of the hoop of FIG. 5;

FIG. 7 is a perspective view showing metal spraying of the marginal edges of a plurality of the flattened hoops shown in FIG. 6;

FIG. 8 is a perspective view illustrating the measuring of the capacitance of one of the flattened hoops which are metal sprayed in FIG. 7;

FIG. 9 shows a perspective view of a device for cutting the flattened capacitor hoop into a plurality of individual chip capacitors;

FIG. 10 is a perspective cross-section taken on the line 10—10 of FIG. 11 showing a multilayer capacitor flat made from a wide web of two-side metalized and plastic coated dielectric material which differs from the strip of FIG. 1 in that it has multiple metalized patterns adapted to be cut longitudinally along the dotted lines;

FIG. 11 is a perspective view of a flattened capacitor hoop wound from material shown in cross-section in FIG. 10 with the cutting lines dotted;

FIG. 12 is a plan view of a modified form of multilayer capacitor flat with the top layer of plastic removed to expose the electrode plates, which is similar to the capacitor flat of FIG. 10 except that the longitudinal metalized patterns are interrupted by cleared areas;

FIG. 13 is a cross-sectional view taken on the line 13—13 of FIG. 14 transversely of the length of the dielectric strip;

FIG. 14 is a cross-sectional view taken along the line 14—14 in FIG. 12;

FIG. 15 is a perspective view of a capacitor chip formed by cutting the flattened hoop shown in FIGS. 12—14 in two directions and applying a sprayed metal coating to the edges having exposed electrodes;

FIG. 16 is a view similar to 15 showing the application of a sprayed metal coating not only to the exposed electrodes, but partially around one end of the capacitor and the application of a coating of solder to that portion of the sprayed coating which is not in direct contact with the electrodes;

FIG. 17 is a longitudinal section through a modified form of multilayer capacitor flat having a series of cleared longitudinal lanes and transverse cutting lanes which are staggered to present alternate electrodes;

FIG. 18 is a diagrammatic representation of the application of a sprayed metal coating to the offset electrodes of capacitor chips cut from the capacitor flat of FIG. 17; and FIG. 19 is a perspective view of an individual capacitor chip cut from the capacitor flat shown in FIG. 17 and sprayed with metal on its beveled ends.

DESCRIPTION OF THE PREFERRED EMBODIMENT

FIG. 1 shows a cross-section of a composite film strip indicated generally at 10 from which the chip capacitor of the invention is formed. The film composite includes a dielectric substrate 12 which may be polyester, on the opposite sides of which are deposited evaporated metal coatings 14, 16 of an electrode metal such as aluminum. The metalized electrode coatings 14 and 16 are then coated with an extremely thin layer of dielectric 18, 20 such as polystyrene or polycarbonate plastics which extends to their marginal edges 22, 24. When a plurality of the composite layers 10 are pressed together and heated in a manner to be hereinafter described, the thin plastic coatings 18, 20 fuse together to form a monolithic capacitor having a much higher capacitance than an ordinary polyester capacitor since the plastic coatings 18, 20 have a combined dielectric thickness substantially less than the thickness of the substrate 12. Typical thicknesses of the various materials are 0.0002 inch for the polyester substrate, 0.000001 for the metallic electrode layers 14, 16 and 0.000025 inch for each of the thin plastic coatings 18, 20.

The composite film strip 10' shown in FIG. 2 is identical to that shown in FIG. 1 except that the metalized dielectric strip 12' is masked during application of the plastic coatings 18', 20' so as to extend short of the marginal edges 22', 24'.

FIGS. 3 and 4 illustrate the cooperation of a sprayed metal coating 40 or 40' with the marginal edges 22 or 22' of a multilayer stack of composite layers 10 (FIG. 3) or 10' (FIG. 4). In FIG. 3, it can be seen that the lower plastic coating on one composite layer 10 has been fused together with the upper plastic layer of the adjacent composite layer 10 to form an integral fused coating 19 due to application of heat and pressure to the stack. The sprayed metallic coating 40 can be seen as slightly penetrating the edges of the substrate 12 and much more deeply penetrating the softer plastic 19 so as to become embedded in it and penetrate it so as to make contact with portions of the flat surface of electrodes 14 as well as their ends. In FIG. 4 it can be seen that the penetration of the metal spray 40' is somewhat deeper than that in FIG. 3 since the plastic coatings 18', 20', and thus the fused coating 19', are recessed. This embodiment would of course provide substantially more direct contact between the metal spray particles 40' and the surfaces of electrodes 14', but at the expense of providing masking during the coating of the electrodes.

To form the capacitor of the present invention, a strip of the composite film 10 is wound in a plurality of convolutions around either a circular collapsible mandrel (not shown) so as to form an annular hoop 30' shown in FIG. 5, or about other structure such as a pair of spaced apart pins which would provide a rather flattened hoop (not shown). In order to hold the hoop together after winding is completed, the outer convolution of the hoop 30' may be heat sealed along a line 32 to the adjacent convolutions. Suitable structure for performing such sealing is shown in U.S. Pat. No. 2,950,070. Although heat sealing, in accordance with the aforementioned U.S. patent, wherein cutting of the web takes place simultaneously, eliminates the necessity for a separate cutting operation, it is obvious that other methods of sealing and cutting could be used, including the use of adhesives or tape.

FIG. 6 illustrates the processing step of compressing the hoop 30' between a pair of press platens 34, 36 so as to form a capacitor flat 30. In order to eliminate the seal line 32 from having any effect on the capacitor chips 30b which are to be cut from the flat 30, the hoop 30' is pressed so that the seal line 32 will end up in a scrap area of the flat 30 at one of its ends. To form the flat 30, the platens 34, 36 are heated so that the plastic layers 18, 20 will be slightly softened so as to flow together and bond to each other without affecting the substrate dielectric material 12. The amount of heat and pressure applied varies, depending on the particular materials used. However, it is important that the pressure and heat be sufficient to exclude air from between the coated layers 18, 20 but not be so great as to cause such layers 18, 20 to extrude outwardly since such a condition could cause the metallic layers 16, 14 which they separate to short out or could vary the thickness of the final fused layer 19 so as to alter the value of individual capacitor chips cut from the flat 30. After fusing, the plates 34, 36 are cooled before the pressure is released.

FIG. 7 illustrates the step of applying a metal sprayed coating 40 with a gun 42 to the edges of a plurality of capacitor flats 30 held by clamps 44, 46. The coating 40 becomes embedded in the plastic layers 19 as shown in FIGS. 3 and 4 so as to electrically connect each of the electrode layers at one marginal edge of the flat. In order for the particles of metal spray 40 to become embedded in the plastic layer 19, and contact not only the terminal edge portions of the electrodes 14, but also a portion of their flat surfaces, the metal spraying must be done at rather high velocity. Suitable commercially available materials and equipment and settings which have proved suitable, are as follows: a Metco 4E Gun, a Metco Flow Meter, and Metco 15 gauge aluminum wire. The wire is fed at a rate of 13 plus or minus 2 feet per minute with the gun nozzle being approximately 5½ inches from the capacitor. During the spraying, the flow meter readings should be approximately 50 for the air, 15 for the oxygen, and 15 for the acetylene. An oxygen-acetylene flame melts the aluminum wire and a concentric, high velocity, air stream breaks up the molten aluminum into particles about 0.001 inch in diameter and impels the hot particles against the thermoplastic capacitor flat.

In FIG. 8 the processing step of clearing is illustrated. The capacitor flat 30 is cleared after metal spraying by subjecting it to an AC voltage passing through the contacts 52, 54 which is equivalent to about one-fourth of its intended rated DC voltage. This low impedance source burns open any major shorting areas. This procedure is followed by a high voltage DC, usually twice the rated voltage, to complete the clearing process.

After clearing the capacitor flat 30, its capacitance value is measured by apparatus (not shown). Since the two semi-circular ends 30a (FIG. 9) of the capacitor flats 30 combine to form the two halves of a cylindrical capacitor which is scrapped, it is a simple mathematical exercise to compare the cross-section of the scrap capacitor cylinder to the flat portion remaining after the ends are removed to determine the capacitance of the elongated remaining flat portion. An additional calculation permits the capacitance per unit of length to be determined, which value can be used to determine the width to which the capacitors should be cut in cutting apparatus 56 (FIG. 9). The cutting apparatus 56 includes a cutter blade 58 which cuts individual capacitor chips 30b from a capacitor flat 30 as the capacitor flat is pushed into the blade by pusher member 60. A vernier stop member 62 permits the width of each capacitor chip 30b to be precisely controlled so that successive capacitors will have substantially identical values. If desired, the first few chips cut from a particular capacitor flat 30 may be value sampled, and the vernier stop 62 readjusted to move the value of subsequent chips to center on a predetermined target value. The chips may also be adjusted downwardly in value by the application of a high voltage to burn back the electrode surface, thereby reducing the electrode area by the desired amount. Although a saw is shown for cutting the capacitor flat, it is obvious that other techniques such as a hot wire, a high speed friction blade, a shear or other device capable of cutting a strip of plastic with a crusty aluminum surface, would be suitable. Since the cutting techniques just mentioned cause electrode material to be wiped together along the the cut edges, it is necessary to clear the parts again to burn open the conductive paths.

FIGS. 10 and 11 illustrate a more efficient production system wherein a wide web of composite film material 110 having metalized patterns 114, 116 coated with plastic 118, 120 which are continuous in a longitudinal direction and staggered transversely is stacked so as to form a multilayer flat bonded together by fused layers 119. Longitudinal cuts made on the lines 131 will produce a plurality of capacitor flats 130 which are individually identical to the capacitor flats 30 previously discussed.

FIGS. 12–14 illustrate a system of electrode patterns differing from FIG. 10 in that the electrodes are interrupted longitudinally so as to provide clear cutting lanes 132 at regular intervals. This system of patterns eliminates the requirement of clearing after severing. To form chip capacitors from the wide web of flat portions 230, the composite strips 210 can be cut at regular intervals, stacked and then heat pressed and cut. Since the films are transparent except in their electrode areas, the system lends itself to photoelectric registration control. With the electrode pattern system shown in FIGS. 12–14, the fabricated strips may be cut first longitudinally into flats 230, sprayed as in FIG. 7, and then cut transversely into chips as shown in FIG. 15. Or, the fabricated strips may be cut in either direction, than the other to provide an unsprayed chip 230b. This unit may then be stacked with hundreds more to spray the edges after cutting so as to contact the electrodes 214, 216. This latter procedure prevents the cutting operation from breaking any electrical bonds between the sprayed metal 240 and the evaporated electrodes 214 or 216.

FIG. 16 shows a further refinement in the sprayed area which connects the sprayed particles 240 to the evaporated electrodes 214 of a chip 230b. The sprayed area 240 is carried around the chamfered corner 230c and almost across the end 230d. The electrode edges are sprayed with aluminum, then the portion of aluminum on end 230d is over-sprayed with solder 241. This procedure allows the end of the capacitor to be soldered to a tinned substrate pattern by the momentary addition of heat and solder in this localized area. The connection between the metalized electrodes 214 and the sprayed aluminum 240 remains cool, thereby minimizing any chance of thermal damage to this somewhat tenuous connection as the capacitor is connected into its substrate position or as lead wires are assembled.

FIGS. 17–19 shows a modified arrangement for producing a chip which presents more area to the aluminum spray, thereby giving a contact of lower resistance and higher reliability. The individual composite film webs 310 are metalized with clear longitudinal lanes which are stacked in exact register. The transverse clear lanes 332 are staggered to present alternate electrodes at consecutive cut lines. After the capacitor flat 330 is cut on an angle in the cleared area 332, the individual cut chips are stacked as shown in FIG. 19 and metal spray applied thereto from a metalizing gun 342. Since, unlike a wound metalized capacitor, a chip must have every electrode contacted at each layer, the beveled cut presents greater electrode area to the spray to increase the contact area and improve the contact.

FIG. 20 shows a completed beveled chip 330b which has a sprayed metal coating 340 on its exposed electrodes and a solder over-spray coating 341 which functions the same as the coating 241 in FIG. 16.

I claim:

1. A multilayer stack capacitor comprising a plurality of flat layers of plastic strip, a vapor deposited metalized coating on each side of said layers of plastic strip, said metal coatings on each side of said layers overlapping each other and extending to the side marginal edges of said layers except for an unmetalized portion along opposed margins, said layers of metalized plastic strip being affixed firmly to each other by a coating of plastic dielectric, which is substantially thinner than said plastic strips, applied to each of the metalized surfaces of each of said plastic strips, said plastic dielectric being heat softenable so that heat and pressure applied to said stack to bond its layers together will soften said thin plastic dielectric coatings to cause them to fuse together as a dielectric layer which is substantially thinner than the layer of plastic strips and to bond said layers together without damaging said plastic strip layers, and a plurality of particles of sprayed molten metal embedded in each of the opposed margins of said capacitor to a depth less than the width of said unmetalized margin portions so as to penetrate said thin plastic coatings and contact the flat marginal metalized surfaces on each of said layers without substantially penetrating said plastic strip which provides efficient electrical connection between a terminal and the metalized coating.

2. The capacitor of claim 1 wherein the marginal edges of said strip layers of capacitor containing said sprayed metal particles are in planes formed at an acute angle to the planes of said strip layers so as to expose a larger area of said marginal metalized surfaces to said sprayed particles than is possible when said marginal edges are in planes normal to the planes of said layers.